US012551736B2

(12) United States Patent
El Sherif et al.

(10) Patent No.: US 12,551,736 B2
(45) Date of Patent: Feb. 17, 2026

(54) PERSONAL PROTECTION SYSTEM AND METHOD

(71) Applicant: Pabban Development, Inc., Irvine, CA (US)

(72) Inventors: Dina El Sherif, Irvine, CA (US); Christopher Simbulan, Irvine, CA (US); Lawrence J. Green, Irvine, CA (US); H. Nicholas Herbert, Irvine, CA (US); Jacob Herbert, Irvine, CA (US)

(73) Assignee: Pabban Development, Inc., Irvine, CA (US)

( * ) Notice: Subject to any disclaimer, the term of this patent is extended or adjusted under 35 U.S.C. 154(b) by 0 days.

(21) Appl. No.: 19/272,899

(22) Filed: Jul. 17, 2025

(65) Prior Publication Data

US 2025/0339714 A1 Nov. 6, 2025

Related U.S. Application Data

(63) Continuation of application No. PCT/US2024/057964, filed on Nov. 29, 2024.

(60) Provisional application No. 63/604,138, filed on Nov. 29, 2023.

(51) Int. Cl.

| | |
|---|---|
| *A62B 18/04* | (2006.01) |
| *A41D 13/11* | (2006.01) |
| *A42B 3/22* | (2006.01) |
| *A62B 7/10* | (2006.01) |
| *A62B 9/04* | (2006.01) |
| *A62B 17/04* | (2006.01) |
| *A62B 18/00* | (2006.01) |

(52) U.S. Cl.
CPC .......... *A62B 18/04* (2013.01); *A41D 13/1184* (2013.01); *A62B 7/10* (2013.01)

(58) Field of Classification Search
CPC ....... A62B 18/04; A62B 18/045; A62B 17/04; A62B 17/18; A62B 17/003; A62B 17/006; A62B 17/082; A62B 17/084; A62B 9/04; A41D 13/12; A41D 13/1218; A41D 13/1153; A41D 13/1184
See application file for complete search history.

(56) References Cited

U.S. PATENT DOCUMENTS

| | | | |
|---|---|---|---|
| 5,924,420 | A | 7/1999 | Reischel et al. |
| 12,128,261 | B2 | 10/2024 | Leschinsky et al. |
| 2006/0000006 | A1 | 1/2006 | Gellis et al. |

(Continued)

OTHER PUBLICATIONS

PCT International Search Report and Written Opinion for PCT/US2024/057964, Pabban Development, Inc., Forms PCT/ISA/220, 210, and 237 dated Mar. 25, 2025 (29 pages).

*Primary Examiner* — Valerie L Woodward
*Assistant Examiner* — Mautin I Ashimiu
(74) *Attorney, Agent, or Firm* — BLAIR WALKER IP SERVICES, LLC

(57) ABSTRACT

A protective headcover system includes a support configured to engage the head of a user, a cover configured to substantially cover the head of the user while leaving the ears of the user uncovered, the cover including a substantially transparent facial shield and a sheet sealingly coupled to the facial shield, the sheet including an elongate projection inward from or including a perimeter of the sheet, and a first dynamic hook coupled to the support and configured to displaceably engage the elongate projection of the sheet.

30 Claims, 14 Drawing Sheets

(56) References Cited

U.S. PATENT DOCUMENTS

| | | | | |
|---|---|---|---|---|
| 2010/0263671 | A1* | 10/2010 | Walker | A62B 17/04 128/205.25 |
| 2014/0075652 | A1 | 3/2014 | Hanson et al. | |
| 2019/0166929 | A1 | 6/2019 | Bergman | |
| 2021/0077838 | A1 | 3/2021 | Walker et al. | |
| 2021/0282476 | A1* | 9/2021 | Memita | A41D 13/1161 |
| 2022/0079271 | A1 | 3/2022 | Memita | |
| 2022/0151321 | A1 | 5/2022 | Hines et al. | |
| 2023/0292857 | A1 | 9/2023 | Herbert et al. | |
| 2023/0398382 | A1 | 12/2023 | Ma et al. | |

* cited by examiner

PERSONAL PROTECTION SYSTEM AND METHOD

INCORPORATION BY REFERENCE TO ANY PRIORITY APPLICATIONS

This application is a continuation of international application no. PCT/US2024/057964, filed on Nov. 29, 2024, which claims the benefit of priority to U.S. Provisional Application No. 63/604,138, filed on Nov. 29, 2023, both of which are incorporated by reference in their entirety herein for all purposes. Priority is claimed pursuant to 35 U.S.C. § 120 and 35 U.S.C. § 119.

BACKGROUND OF THE INVENTION

Field of the Invention

The field of the invention generally relates to personal protection systems, including, but not limited to personal environmental protections systems. The personal protections systems often include a headgear structure which is worn by an individual to protect from particulate material. The personal protection systems may provide filtered air to the user.

SUMMARY OF THE INVENTION

In one embodiment of the present disclosure, a protective headcover system includes a support configured to engage the head of a user, a cover configured to substantially cover the head of the user while leaving the ears of the user uncovered, the cover including a substantially transparent facial shield and a sheet sealingly coupled to the facial shield, the sheet including a perimeter, and a first slidable hook coupled to the support and configured to slidingly engage a first lateral portion of the perimeter of the sheet.

In another embodiment of the present disclosure, a protective headcover system includes a support configured to engage the head of a user, a cover configured to substantially cover the head of the user while leaving the ears of the user uncovered, the cover including a substantially transparent facial shield and a sheet configured to be sealingly coupled to the facial shield, the sheet including a perimeter, and a first slidable hook coupled to the support and configured to slidingly engage a first lateral portion of the perimeter of the sheet.

In yet another embodiment of the present disclosure, a protective headcover system includes a support configured to engage the head of a user, a cover configured to substantially cover the head of the user while leaving the ears of the user uncovered, the cover including a substantially transparent facial shield and a sheet sealingly coupled to the facial shield, the sheet including a perimeter, and a first dynamic hook coupled to the support and configured to displaceably engage a first lateral portion of the perimeter of the sheet.

In still another embodiment of the present disclosure, a protective headcover system includes a support configured to engage the head of a user, a cover configured to substantially cover the head of the user while leaving the ears of the user uncovered, the cover including a substantially transparent facial shield and a sheet configured to be sealingly coupled to the facial shield, the sheet including a perimeter, and a first dynamic hook coupled to the support and configured to displaceably engage a first lateral portion of the perimeter of the sheet.

In yet another embodiment of the present disclosure, a protective headcover system includes a support configured to engage the head of a user, a cover configured to substantially cover the head of the user while leaving the ears of the user uncovered, the cover including a substantially transparent facial shield and a sheet sealingly coupled to the facial shield, the sheet including a perimeter, a left slideable hook coupled to the support and configured to slidingly engage a left portion of the perimeter of the sheet, and a right slideable hook coupled to the support and configured to slidingly engage a right portion of the perimeter of the sheet.

In still another embodiment of the present disclosure, a protective headcover system includes a support configured to engage the head of a user, a cover configured to substantially cover the head of the user while leaving the ears of the user uncovered, the cover including a substantially transparent facial shield and a sheet sealingly coupled to the facial shield, the sheet including a perimeter, a left dynamic hook coupled to the support and configured to displaceably engage a left portion of the perimeter of the sheet, and a right dynamic hook coupled to the support and configured to displaceably engage a right portion of the perimeter of the sheet.

In yet another embodiment of the present disclosure, a protective headcover system includes a support configured to engage the head of a user, a cover configured to substantially cover the head of the user while leaving the ears of the user uncovered, the cover including a substantially transparent facial shield and a sheet configured to be sealingly coupled to the facial shield, the sheet including a perimeter, a left slideable hook coupled to the support and configured to slidingly engage a left portion of the perimeter of the sheet, and a right slideable hook coupled to the support and configured to slidingly engage a right portion of the perimeter of the sheet.

In still another embodiment of the present disclosure, a protective headcover system includes a support configured to engage the head of a user, a cover configured to substantially cover the head of the user while leaving the ears of the user uncovered, the cover including a substantially transparent facial shield and sheet material configured to be sealingly coupled to the facial shield, the sheet material including a perimeter, a left dynamic hook coupled to the support and configured to displaceably engage a left portion of the perimeter of the sheet, and a right dynamic hook coupled to the support and configured to displaceably engage a right portion of the perimeter of the sheet.

In yet another embodiment of the present disclosure, a protective headcover system includes a support configured to engage the head of a user, a cover configured to substantially cover the head of the user including the ears of the user, the cover including a substantially transparent facial shield and a sheet configured to be sealingly coupled to the facial shield, the sheet including a perimeter, and further including an elongate projection spaced inwardly from and parallel to at least a portion of the perimeter of the sheet; and a first dynamic hook coupled to the support and configured to displaceably engage the elongate projection of the sheet.

In still another embodiment of the present disclosure, a protective headcover system includes a support configured to engage the head of a user, a cover configured to substantially cover the head of the user while leaving the ears of the user uncovered, the cover including a substantially transparent facial shield and a sheet sealingly coupled to the facial shield, the sheet including an elongate projection inward from or including a perimeter of the sheet, and a first dynamic hook coupled to the support and configured to displaceably engage the elongate projection of the sheet.

DETAILED DESCRIPTION OF THE ILLUSTRATED EMBODIMENTS

There are several types of air flow, filtration and protective systems which are known in the art. Several types of such systems are currently available on the market for use in surgical arenas, in "clean room" environments, or in hazardous/contaminated environments.

Some of the existing systems include hoods, gowns, filters, and the like. In some instances, the air filters are built into the helmet structure. Known units frequently include external sources of air such as gas cylinders, air lines or the like which are connected to the helmet structure by tubes, hoses or the like. Currently available lens/facial seal combinations, sometimes known as loose fitting hoods, are expensive to manufacture due to the geometries required for the facial seal to attach to the lens which is curved in a plane perpendicular to the seal to the face/head of the wearer. Improvements described herein related to the interface between facial shields and headgear (helmets, etc.) accommodate clean or sterile donning techniques, and improve the overall ease of donning the protective equipment and garments. In sterile procedures, any improvements that lower or minimize contact, or decomplicate the donning steps can significantly improve the likelihood of achievement and maintenance of sterility. These improvements can also minimize unnecessary contamination to other sites. The systems described herein can also be utilized for general healthcare use or general laboratory use, as well as in surgery, medical procedure, or dental use. The systems can comprise PAPR (Powered Air Purifying Respirator) systems comprising a blower with a motor, but can also comprise non-powered systems, including physical or acoustical protection systems, such as those used in construction or airport or raceway communication and/or protection. The systems described herein can also be utilized in general PPE (personal protective equipment).

Some of the existing systems include hoods, gowns, filters, and the like. In some instances, the air filters are built into the helmet structure. Known units frequently include external sources of air such as gas cylinders, air lines or the like which are connected to the helmet structure by tubes, hoses or the like. Other systems do not have hoses, such as no hose respirators and no hose powered air purifying respirators.

Figure 1:
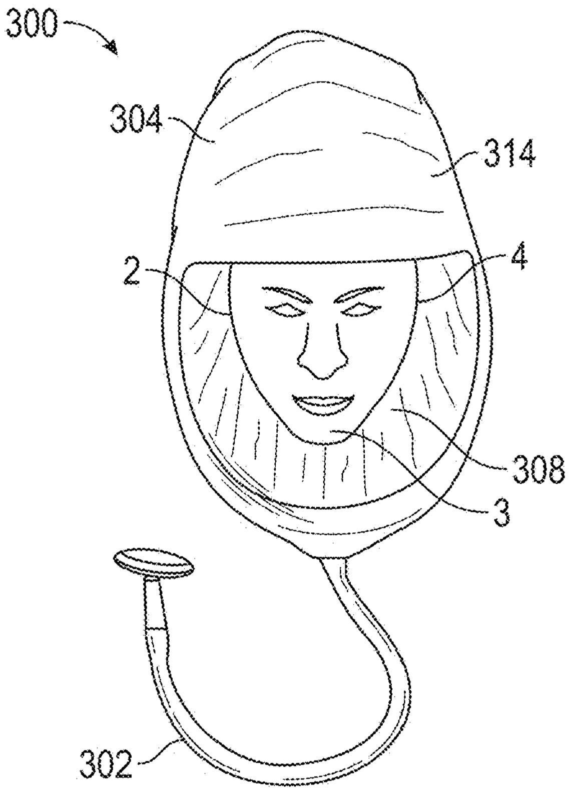
FIG. 1 (Prior Art)
FIG. 1 is a first perspective view of a prior art personal protection assembly, according to an embodiment of the present disclosure.
Figure 2:
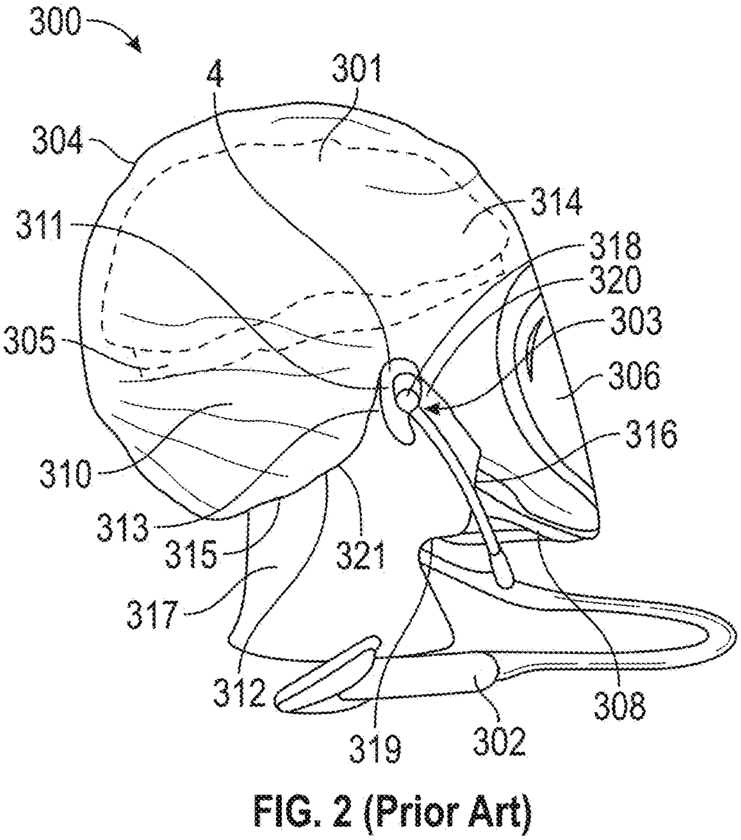
FIG. 2 (Prior Art)
FIG. 2 is a second perspective view of the prior art personal protection assembly of FIG. 1.

FIGS. 1-2 illustrate a prior art personal protection assembly 300 configured to protect a user 2. The personal protection assembly 300 includes a head cover 304, coupled to a substantially clear facial shield 306 for viewing therethrough. The head cover 304 is also coupled to a cuff 308 that is able to conform to the face 3 of the user 2. The head cover 304 includes a posterior portion 310 that coverably fits around a posterior part of the user's head 313. The head cover 304 includes a perimeter 312 that is configured to hook over the portion of the user's ear 4 that is most superior portion of skin between the helix 311 of the ear 4 and the head 313 of the user 2. This area is similar to a valley or groove, and is the area that the temples and/or temple tips of eyeglasses are configured to rest. The perimeter 312 can comprise gathered fabric covering an elastic band. An anterior portion 314 of the head cover 304 coverably fits around an anterior part of the user's head 313. A posterior region 315 of the perimeter 312 can be configured, for example, to enclose against the posterior neck 317 of the user 2, covering the hair. An anterior region 316 of the perimeter 312 can be configured to enclose against the anterior neck 319 of the user 2, covering the chin or the chin and beard, depending on the user. Thus, the perimeter 312 as a whole allows the head cover 304 to cover and protect the user 2, while allowing complete access of the user's ears 4 for earphones 318 of a stethoscope 302, or earbuds, or any types of earpieces 303.

In some embodiments, the personal protection assembly 300 includes a helmet 301 underneath the head cover 304 and configured to engage a top portion of the head 313 of the user 2. A headband 305 can be coupled to the helmet 301 to engage the head 313 and keep the helmet 301 in place. Though the hooking of the perimeter 312 between the ear 4 and the head 313 creates a space 320 that allows access to the ears, for use with earpieces 303, there can often be friction or a mechanical stasis, e.g., from the elastic 321 around the upper portion of the area between the helix 311 and the head 313. Thus, when the user 2 turns their head 313 to the left (or to the right), the personal protection assembly 300 can be caused to cock or otherwise be slightly or significantly displaced. Furthermore, subsequently turning the head 313 back to a central position oftentimes does not reset the personal protection assembly 300 into the desired position. This can be the case whether the personal protection assembly 300 incorporates a helmet 301 and headband 305, or not.

The following embodiments of this disclosure can be configured to be incorporated into systems that are described in co-owned International Application Pub. No. WO2023/076498 A1 to PABBAN DEVELOPMENT, INC., published May 4, 2023, and entitled "Personal Protection System and Method," which is hereby incorporated by reference in its entirety for all purposes. Embodiments include wherein a sheet (e.g., head cover 304) comprises a first sheet material configured to act as a substantial barrier to the passage of air, and wherein the sheet further comprises a second sheet material configured to filter contaminants from air a cover, a flow restrictor configured to significantly create a flow barrier between the cover and the neck of the user for providing an interior volume within the cover, significantly isolated from external air, an air mover configured to draw some of the external air into the interior volume of the cover, a filter coupled to the cover and configured to filter the air drawn by the air mover, and one or more flow directors configured to be carried within the cover and configured to direct internal air, including at least some exhaled air from the user, toward the second sheet material.

Figure 3:
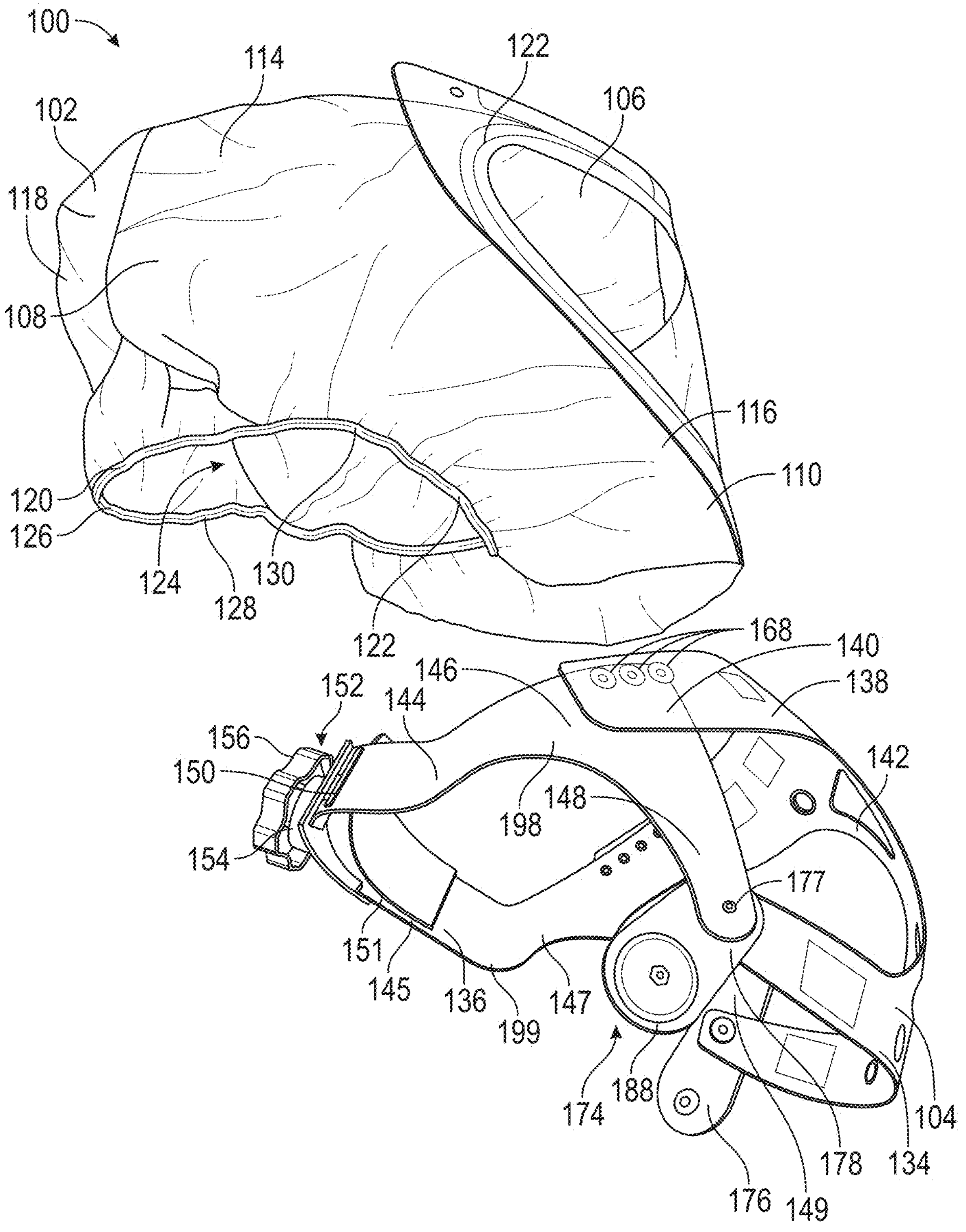
FIG. 3 is a perspective view of a personal protection assembly, according to an embodiment of the present disclosure.
Figure 4:
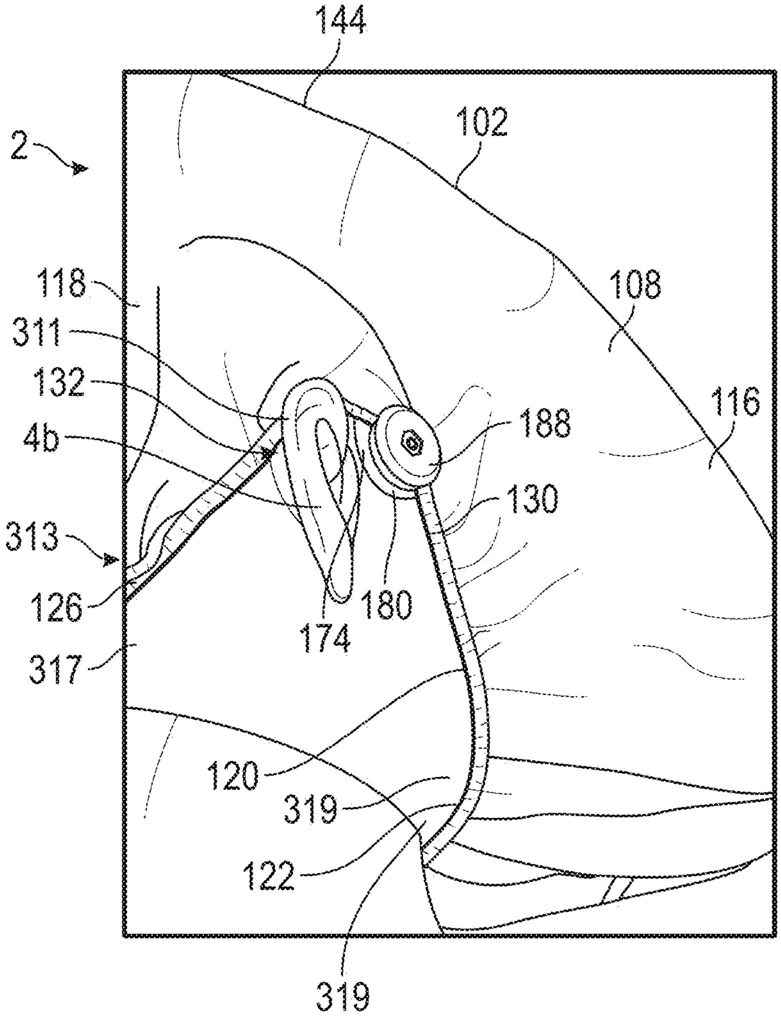
FIG. 4 is a perspective view of the personal protection assembly of FIG. 3 in place on the head of a user, according to an embodiment of the present disclosure.

FIGS. 3-4 illustrate a personal protection assembly 100 comprising a bonnet 102 and a frame 104. The bonnet 102 is configured to cover a user's head 313, and comprises a facial shield 106 (or lens) which comprises a substantially transparent material, such as a sheet comprising high clarity polymer such as polyethylene terephthalate glycol (PETG), polyethylene terephthalate (PET), or other polyesters or polyester copolymers, or acrylic, or polycarbonate, such that it can provide a relatively thin but tough barrier that does not significantly impede the vision of the user 2. A sheet 108 surrounds the facial shield 106, and the facial shield 106 is adhesively secured to an edge 110 of the sheet 108 along a seal 112. The seal 112 can follow a continuous circular, oval, rectangular, teardrop, or other shape. The sheet 108 can comprise a breathable soft composite material, for example a Type 4 composite material, per AAMI PB70 and/or EN13795 standards. In some embodiments, the sheet 108 comprises a meltblown polypropylene material. Materials for the sheet 108 in some embodiments include a tri-laminate comprising a film held between two layers of non-woven plastic fabric. Bi-laminate materials are also possible, such as a material comprising a film layer and a non-woven plastic fabric. In some embodiments, the non-woven layer or layers can comprise a cellulose. In some embodiments, the non-woven layer comprises spun materials such as spunbonded high density polyethylene (e.g., Tyvek®, a trademark of DuPont de Nemours, Inc.). In one embodiment a spunbond meltblown spunbond, commonly known as SMS, can be used, and comprises a tri-laminate non-woven fabric comprising a top layer of spunbond polypropylene, a middle layer of meltblown polypropylene and a bottom layer of spunbond polypropylene. In other embodiments, one or more of the non-woven layers can be replaced by a woven layer.

The sheet 108 includes a superior portion 114, an anterior portion 116, and posterior portion 118, and a perimeter 120. The perimeter 120 comprises gathered fabric that covers an elastic band. In some embodiments, the elastic band comprises a non-latex elastomer ribbon having a width of 1 mm to 5 mm, or 2 mm to 4 mm. In some embodiments, the gathered fabric cover has a transverse dimension or diameter of between 1 mm and 4 mm, or between 1.5 mm and 3 mm. The perimeter 120 comprises an anterior portion 122 which is configured to substantially prevent air leaking from an interior 124 of the bonnet 102 by substantially sealing or otherwise closing over the anterior neck 319 of the user 2. The perimeter 120 further comprises a posterior portion 126 which is configured to substantially prevent air leaking from the interior 124 of the bonnet 102 by substantially sealing or otherwise closing over the posterior neck 317 of the user 2. FIG. 3 illustrates a left lateral portion 128 and a right lateral portion 130 of the perimeter 120. In use, as shown in FIG. 4, the right lateral portion 130 is configured to be placed over the right ear **4*b* of the user 2. However, unlike the head cover 304 of FIGS. 1-2, the right lateral portion 130 is not configured to tightly, physically hook to the most superior portion 132 of skin between the helix 311 of the ear 4*b* and the head 313 of the user 2. The embodiments described herein feature two symmetric sides, configured to be placed in relation to the right ear 4*b* and the left ears (not shown) of the user 2**.

Figure 21:
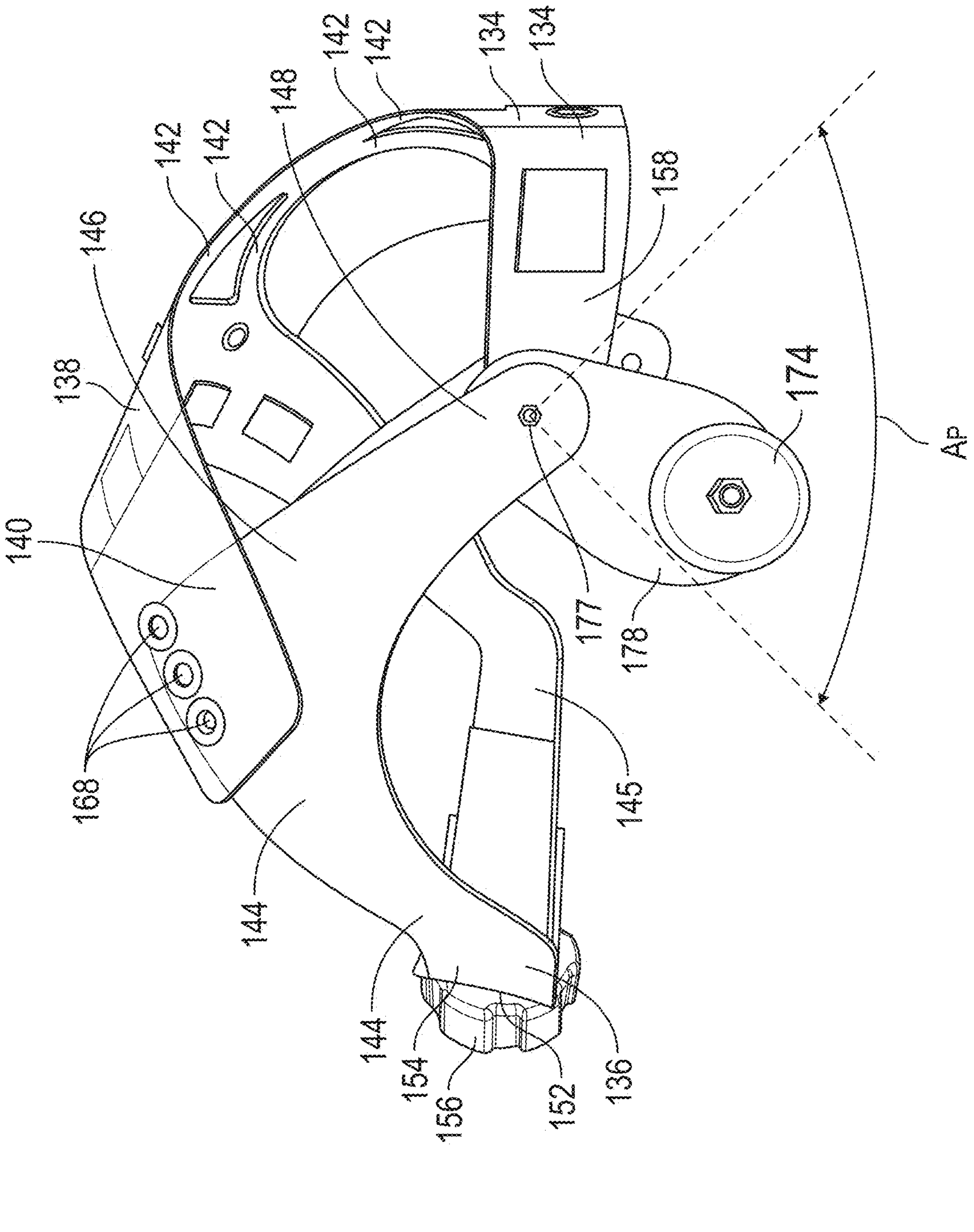
FIG. 21 is a side view of the headband frame of FIG. 19.
Figure 22:
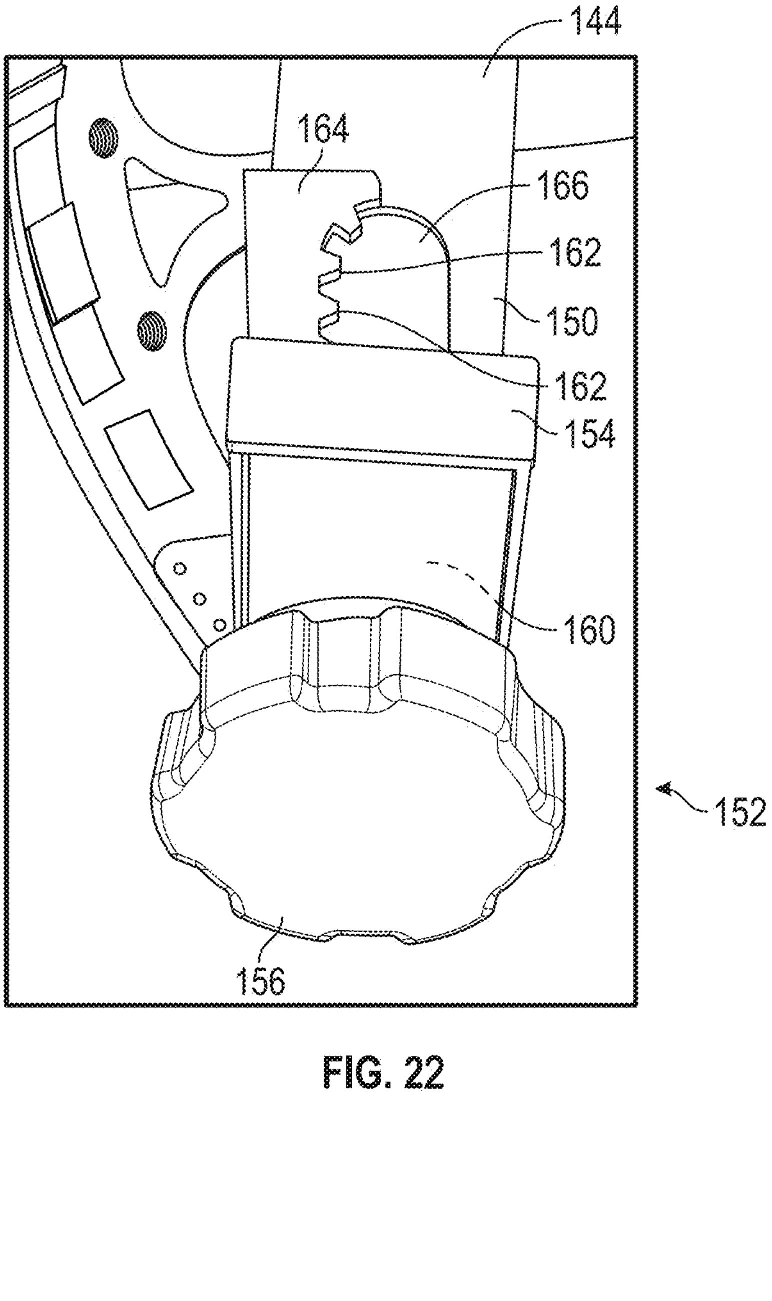
FIG. 22 is a perspective view of an adjuster of the headband frame of FIG. 19.

The frame 104 comprises an anterior headband portion 134 and a posterior headband portion 136. The anterior headband portion 134 is carried by a first strap 138. The first strap 138 also comprises a connection portion 140 and intermediate ribs 142. The intermediate ribs 142 couple the anterior headband portion 134 to the connection portion 140. The intermediate ribs follow a curvilinear path forward and downward from the first strap 138 to the anterior headband portion 134, in a shape that follows the general contour of the anterior-superior portion of a user's head. The posterior headband portion 136 is carried by a second strap 144 and a third strap 145. The second strap 144, at a right side 198 of the frame 104, comprises an intermediate connection portion 146, a distal connection portion 148 and a slidable, adjustable proximal end 150. The third strap 145, at a left side 199 of the frame 104, comprises an intermediate connection portion 147, a distal connection portion 149 and a slidable, adjustable proximal end 151. Each of the straps 138, 144, 145 can comprise a thin, flexible belt-like shape, and can comprise a high-strength polymer such as polyamide, polyester, or polycarbonate. The adjustable proximal end 150 and the adjustable proximal end 151 each insert into a rectangular inner passageway in an adjuster 152, the adjuster 152 comprising an adjuster base 154 and an adjustment knob 156. The adjustable proximal end 150 and the adjustable proximal end 151 are configured to fit as a double layer within the passageway, which allows sliding translation of one or both of the adjustable proximal end 150 and the adjustable proximal end 151, to change the effective circumference/perimeter 158 of the anterior headband portion 134 and the posterior headband portion 136, to fit around the head of the user. The adjustment knob 156 and the adjustable proximal ends 150, 151 are configured so that the effective headband perimeter 158 (FIG. 21), which comprises the combination of the anterior headband portion 134 and the posterior headband portion 136, can be decreased/tightened (FIG. 19, solid arrows) or increased/loosened (FIG. 19, dashed arrows). In the embodiment illustrated in FIGS. 3-22, the adjuster 152 includes an internal spring-loaded locking element 160 (FIG. 22) configured to allow teeth 162, extending on a first side 164 of an elongate opening 166 of the adjustable proximal end 150 of second strap 144 to snap/lock at each locking gradation. The proximal end 151 of the third strap 145 also includes the teeth 162, though this is not shown in FIG. 22. Thus, a user can adjust the effective headband perimeter 158 to match their own head size, and to contain the desired level of snugness in relation to their head/hair. In an alternative embodiment, the adjuster 152 can incorporate an adjuster knob 156 that is configured to tighten and untighten to lock and unlock any amount of dimensional change in the effective headband perimeter 158. In another alternative embodiment, the adjuster knob 156 is configured to decrease/tighten the effective headband perimeter 158 by being turned in a first direction (e.g., clockwise), and to increase/loosen the effective headband perimeter 158 by being turned in a second direction (e.g., counter-clockwise). The opposite directions are also possible. Any manner of effective headband perimeter 158 is within the scope of the present disclosure.

Figure 26:
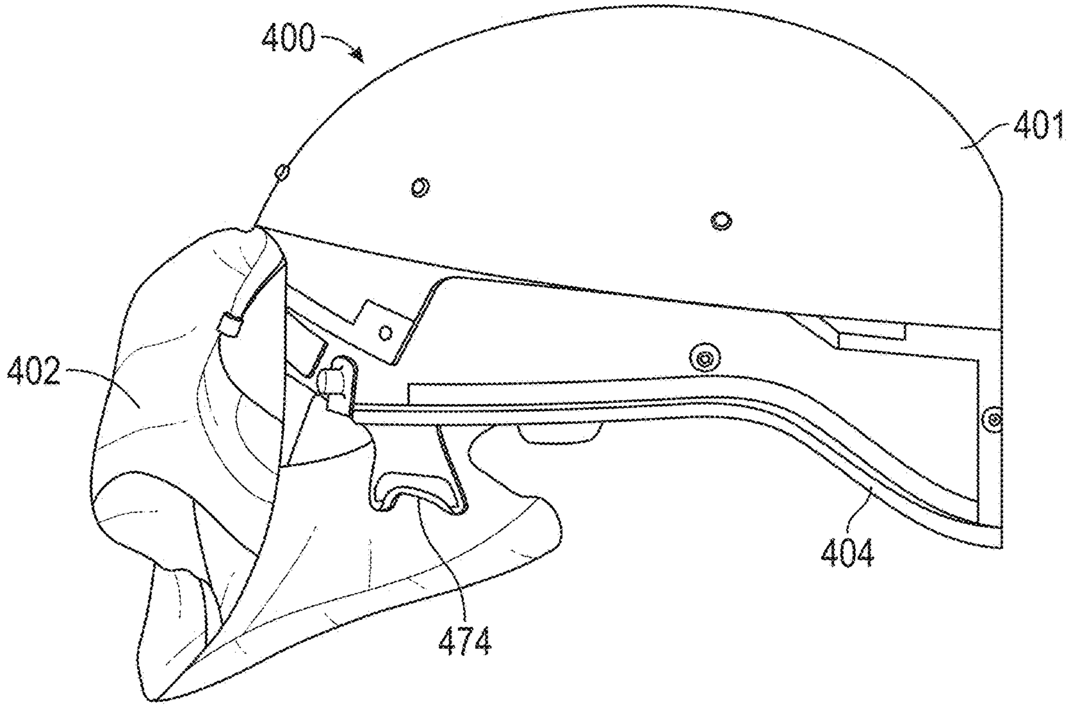
FIG. 26 is a perspective view of an alternative personal protection assembly including hooks from FIGS. 24-25, according to an embodiment of the present disclosure.
Figure 27:
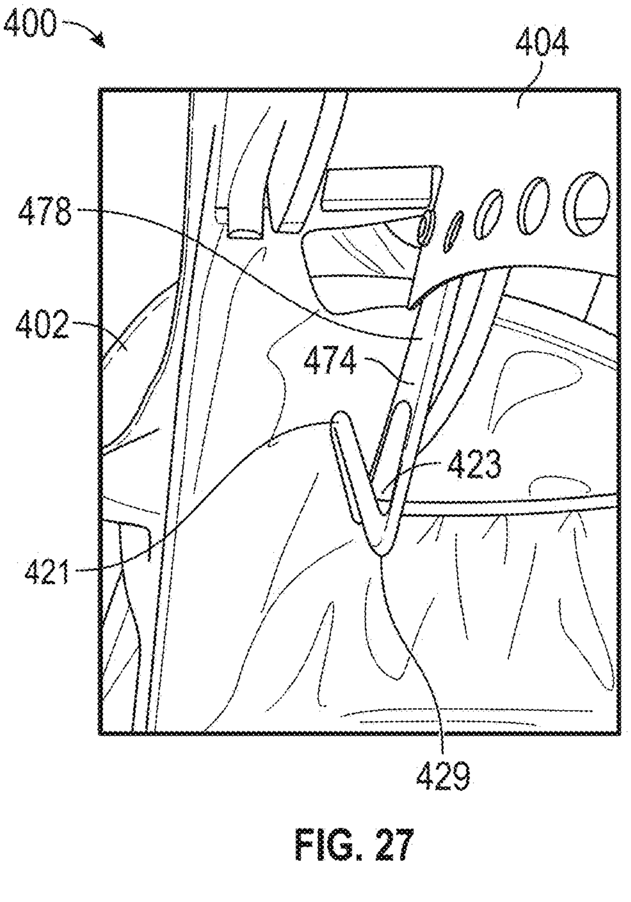
FIG. 27 is a detail perspective view of the personal protection assembly of FIG. 26.

The frame 104 is constructed into a structure for engaging the head 313 of a user 2 by connective elements 168 (brads, staples, rivets, snaps, melt-bonds, adhesive bonds, epoxy bonds, etc.) which connect the right connection portion 140 of the first strap 138 to the intermediate connection portion 146 of the second strap 144; and which connect the left connection portion 140 of the first strap 138 (mirror image of the right connection portion 140) to the intermediate connection portion 147 of the third strap 145. These connections allow the frame 104 to engage the head 131 of the user 2 at the perimeter 158, aided by the adjustment capability of the adjuster 152. A helmet, such as the helmet 301 illustrated in FIG. 2, can be carried by the frame 104, for example, between the frame 104 and the bonnet 102, or between the frame 104 and any other type of head cover (gaiter, hood, shroud, etc.). For example, it may comprise a gaiter 402, as shown in FIGS. 26-27, such as the gaiter-type coverings shown in FIGS. 31, 41-44, 53, and 57 of co-owned International Application Pub. No. WO2023/076498 A1 to PABBAN DEVELOPMENT, INC., published May 4, 2023, and entitled "Personal Protection System and Method,". Snap holes 170, 171, 172, 173 (FIG. 20) in the first strap 138 of the frame 104 are configured to snappably and unsnappably receive male snaps that are carried within the front interior of the helmet. The snap holes 170, 171 face substantially anteriorly, and the snap holes 172, 173 face substantially superiorly. However, the curvature of the first strap 138 of the frame 104, when the frame 104 is assembled, tends to make the internal axes of the snap holes 170, 171 be non-parallel and the make the internal axes of the snap holes 172, 173 non-parallel. However, because of the flexibility of the first strap 138, the snapping of the first strap 138 to the snaps within the helmet can change the relationship (e.g., angle) between the axes. In some embodiments, the snapping can even cause the axes to be substantially parallel.

Figure 14:
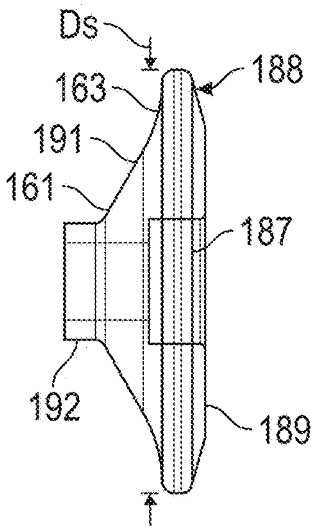
FIG. 14 is a side view of the stop.
Figure 15:
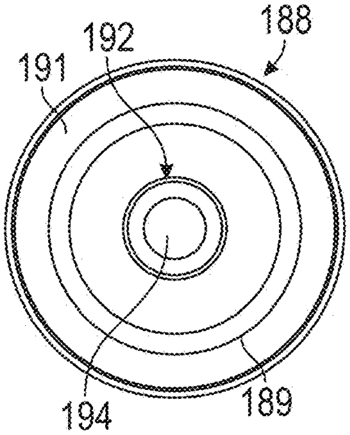
FIG. 15 is a top view of the stop.
Figure 16:
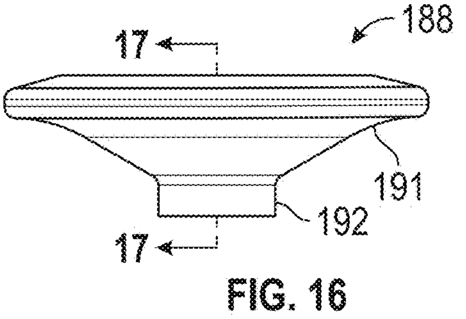
FIG. 16 is another side view of the stop.
Figure 17:
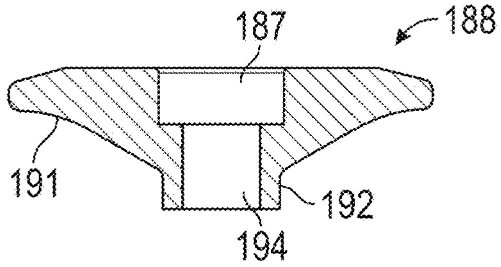
FIG. 17 is a cross-sectional view of the stop taken along line 17 of FIG. 16.
Figure 20:
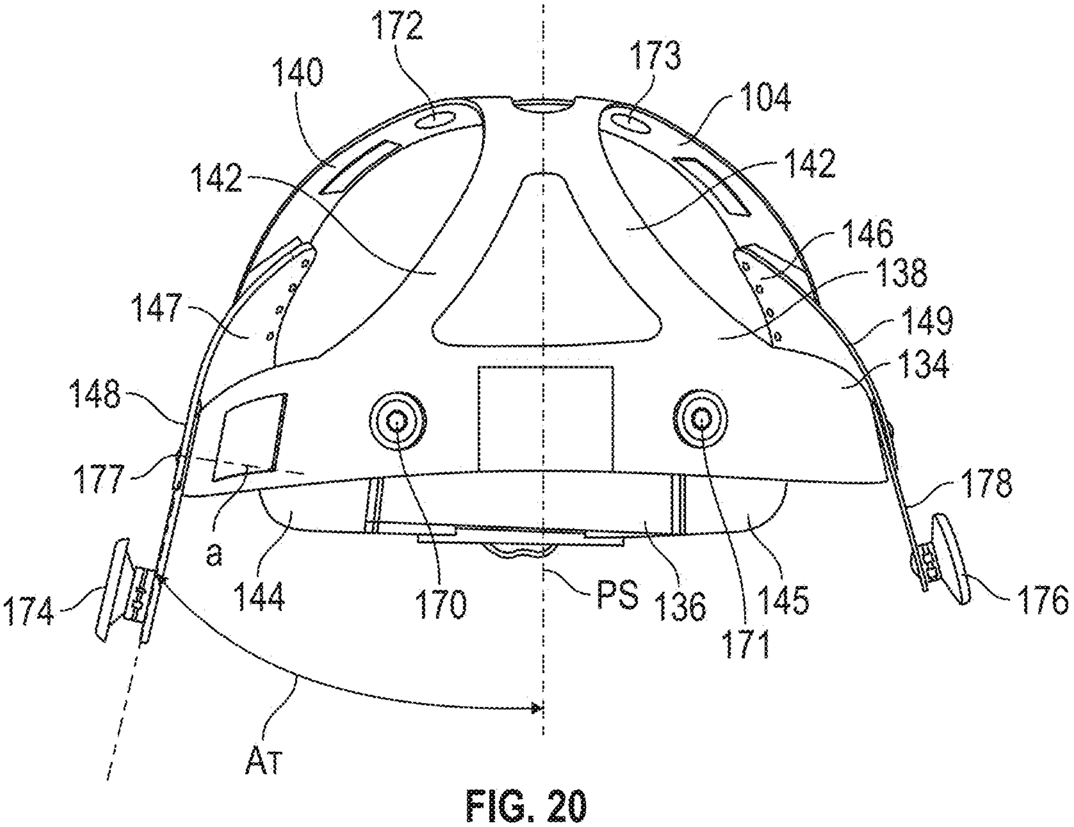
FIG. 20 is a front view of the headband frame of FIG. 19.

The frame 104 further comprises a right hook assembly 174 and a left hook assembly 176. Each hook assembly 174, 176 has a similar configuration, and is mirrored on the frame 104 in relation to the other, in relation to a sagittal plane $P_S$ (FIG. 20). Detail of the hook assemblies 174, 176 will be described in specific relation to the right hook assembly 174. Turning to FIGS. 5-17, the right hook assembly 174 comprises a planar base 178 having a first portion 180 and a second portion 182, a button 184 having a cylindrical sliding surface 186, and a stop 188 having a stop diameter $D_S$ (FIG. 14). The perimeter 120 of the sheet 108, can comprise gathered fabric that covers an elastic band. The perimeter 120 is kept in place in sliding relation adjacent the cylindrical sliding surface 186 by being substantially trapped or bookended between the planar base 178 and an inner surface 191 (FIG. 14) of the stop 188. The maximum diameter $D_S$ (FIG. 14) of the stop 188 is greater than the diameter $D_B$ (FIG. 8) of the cylindrical sliding surface 186 of the button 184. The transverse width $W_T$ (FIG. 11) of the planar base 178 is also greater than the diameter $D_B$ (FIG. 8) of the cylindrical sliding surface 186 of the button 184. The first portion 180 and second portion 182 of the planar base 178 are spaced from one another, e.g., at or adjacent two ends of the planar base 178. The inner surface 191 of the stop 188 comprises a generally frustoconical surface 161, but in other embodiments can comprise a circumferentially-extending concave surface. In the embodiment shown in in FIG. 14, the frustoconical surface 161 is internal to an adjacent to an outer circumferentially-extending concave surface 163.

The second portion 182 of the planar base 178 comprises a hole 179 extending therethrough. A pin 177 (FIGS. 3 and 21) connects the distal connection portion 148 of the second strap 144 with the anterior headband portion 134 of the first strap 138. Between the distal connection portion 148 and the anterior headband portion 134, the pin 177 extends through the hole 179 of the planar base 178. The pin 171 has at least some space between its outer cylindrical diameter and the interior of the hole 179. Alternatively, it is a friction fit, but the pin 171 and the planar base 178 are both low friction materials. For example, in some embodiments, the pin comprises stainless steel and the planar base comprises polycarbonate. Thus, the planar base 178 is configured to pivot around the pin 177 at an axis a (FIG. 20). A free angle of pivot $A_P$ (FIG. 21) of the planar base 178, and thus of the hook assembly 174 itself, can range from between 0° and 180°, or between 0° and 90°, or between 0° and 30°. For example, the planar base 178 can be configured to pivot around the axis a at least 45° in a first direction and at least 45° in a second direction, or at least 15° in a first direction and at least 15° in a second direction. In some embodiments, the planar base 178 can be lockable to the frame 104 at the pin 177, or even via the pin 177, in order to maintain and hold the planar base 178 at a particular angle of pivot $A_P$. In some embodiments, the planar base 178 can also be unlockable from the frame 104 at the pin 177. The lock can comprise a sliding lock via an additional slit in the planar base, e.g., extending from the hole 179, or can comprise an additional sliding element.

Figure 5:
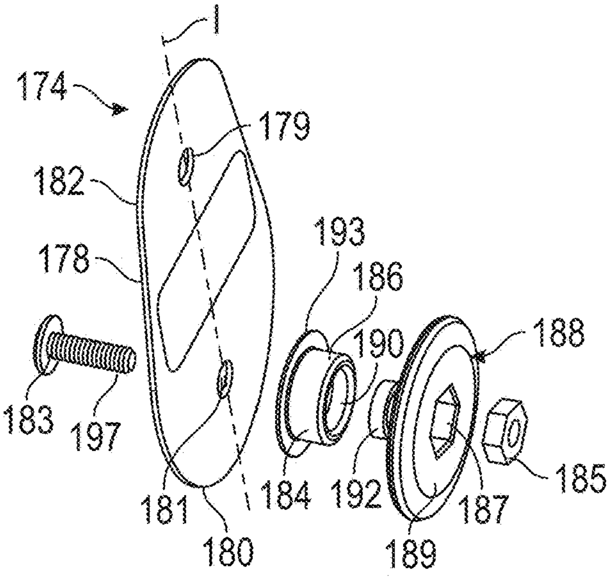
FIG. 5 is an exploded view of a hook assembly, according to an embodiment of the present disclosure.
Figure 6:
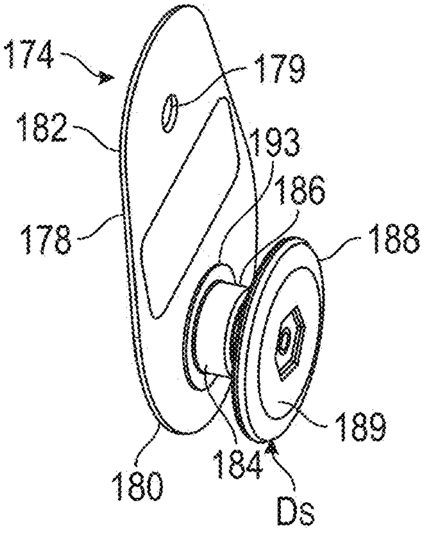
FIG. 6 as a perspective view of the hook assembly of FIG. 5.
Figure 7:
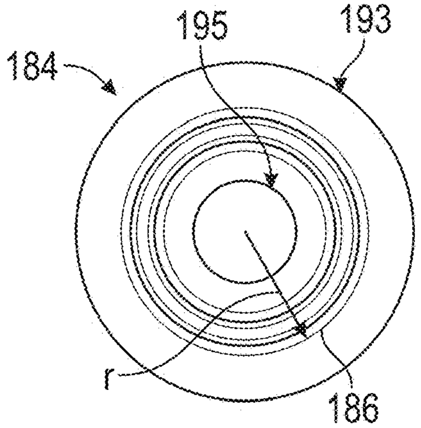
FIG. 7 is an elevation view of a cylindrical surface element of the hook.
Figure 8:
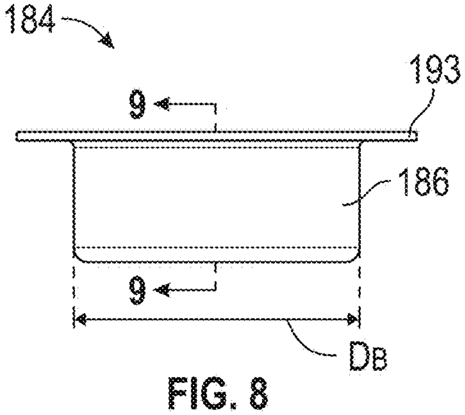
FIG. 8 is a side view of the cylindrical surface element of FIG. 7.
Figure 9:
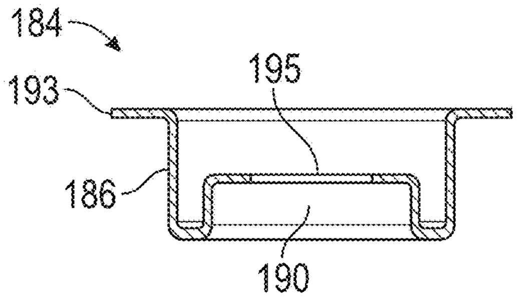
FIG. 9 is a sectional view of the cylindrical surface element taken along line 9 of FIG. 8.
Figure 10:
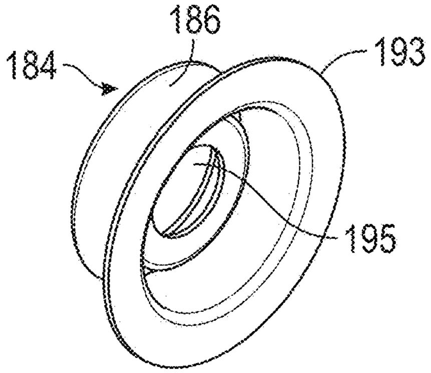
FIG. 10 is a perspective view of the cylindrical surface element.
Figure 11:
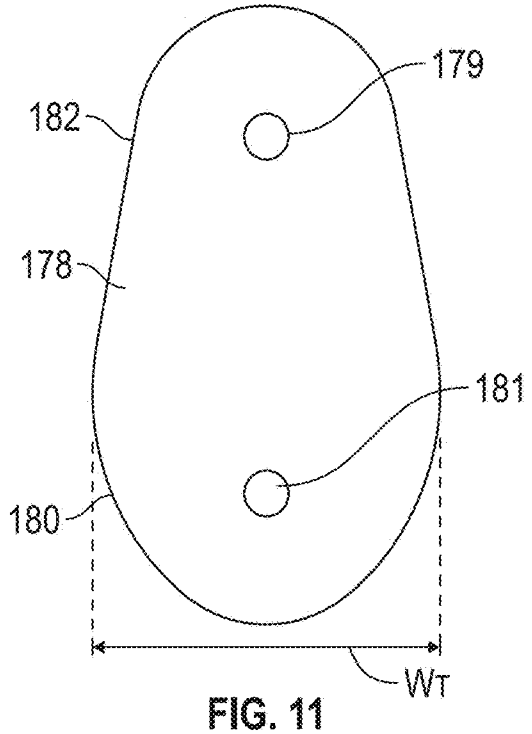
FIG. 11 is an elevation view of a planar mount of the hook.
Figure 12:
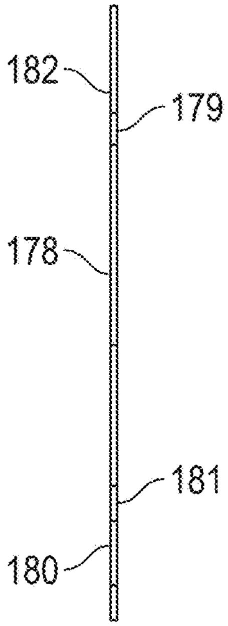
FIG. 12 is a side view of the planar mount.
Figure 13:
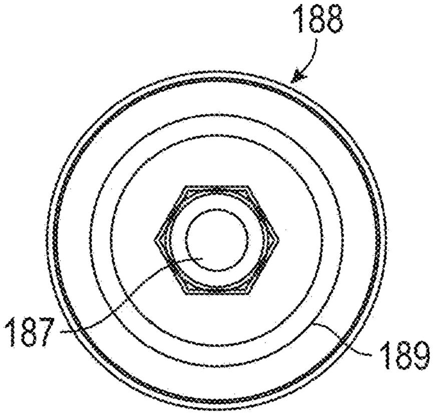
FIG. 13 is a bottom view of a stop of the hook.

The first portion 180 of the planar base 178 comprises a hole 181 extending therethrough. As shown in FIG. 5, the holes 179, 181 can be substantially centrally located along a longitudinal axis 1 of the planar base 178. The button 184 and the stop 188 are connected to the planar base 178 via the hole 181 with a screw 183 and a nut 185. A hexagonal cavity 187 in the stop 188 is configured to keyingly hold the nut 185, and to maintain its rotational orientation in relation to the stop 188. Thus, the planar base 178, button 184, and stop 188 can be secured together by holding the stop 188 and tightening the screw 183 to the nut 185. In the assembled configuration, as shown in FIG. 6, the cylindrical sliding surface 186 of the button 184 is provided between the longitudinal limits of the first portion 180 of the planar base 178 and the body 189 and the stop diameter $D_S$ of the stop 188. The button 184, including the cylindrical sliding surface 186, comprises a smooth and/or lubricious material, such as stainless steel, for example 300 series stainless steel, such as 316 stainless steel. In some embodiments, the cylindrical sliding surface 186 has a surface roughness of 1.6 micrometers or less. The perimeter 120, which can comprise gathered fabric that covers an elastic band, is configured to be slid with low friction over the cylindrical sliding surface 186. The cylindrical sliding surface 186 in some embodiments comprises an arc having a radius r (FIG. 7) of between 7 mm and 13 mm, or between 8 mm and 12 mm, or between 9 mm and 11 mm. As illustrated in FIGS. 5-10, the cylindrical sliding surface 186 extends 360° around the button 184. However, this is not a requirement, and in alternative embodiments, the cylindrical sliding surface can be only present at a limited arc that faces toward the second portion 182 of the planar base 178. This (convex) arc can extend, for example, at least 5° or at least 45°, or in some embodiments, between 5° and 180°, or between 10° and 90°. In some alternative embodiments, the button 184 with a cylindrical sliding surface 186 can be replaced by a button having an hourglass-shaped sliding surface with a circumferentially-extending concavity, or curved trough. The button 184 further comprises a circular flange 193 for interfacing with the planar base 178 via abutment, and a through hole 195 for passage of the shaft 197 of the screw 183. A circular opening 190, or counterbore, extending on the side the button 184 of the flange 193, allows a hub 192 of the stop 188 to fit within the opening 190 when the screw 183 is sufficiently tightened. The stop 188 also comprises a through hole 194 for passage of the shaft 197 of the screw 183.

Figure 18:
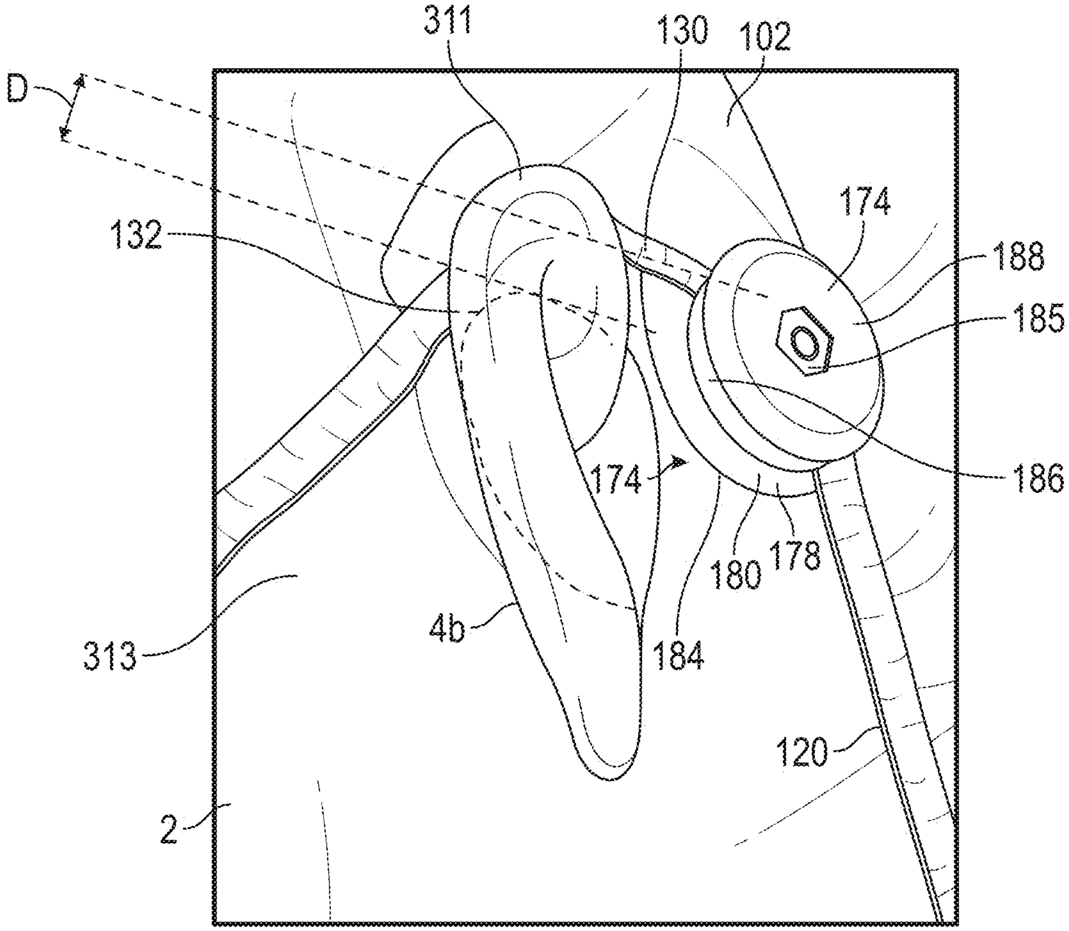
FIG. 18 is a detail view of FIG. 4.
Figure 19:
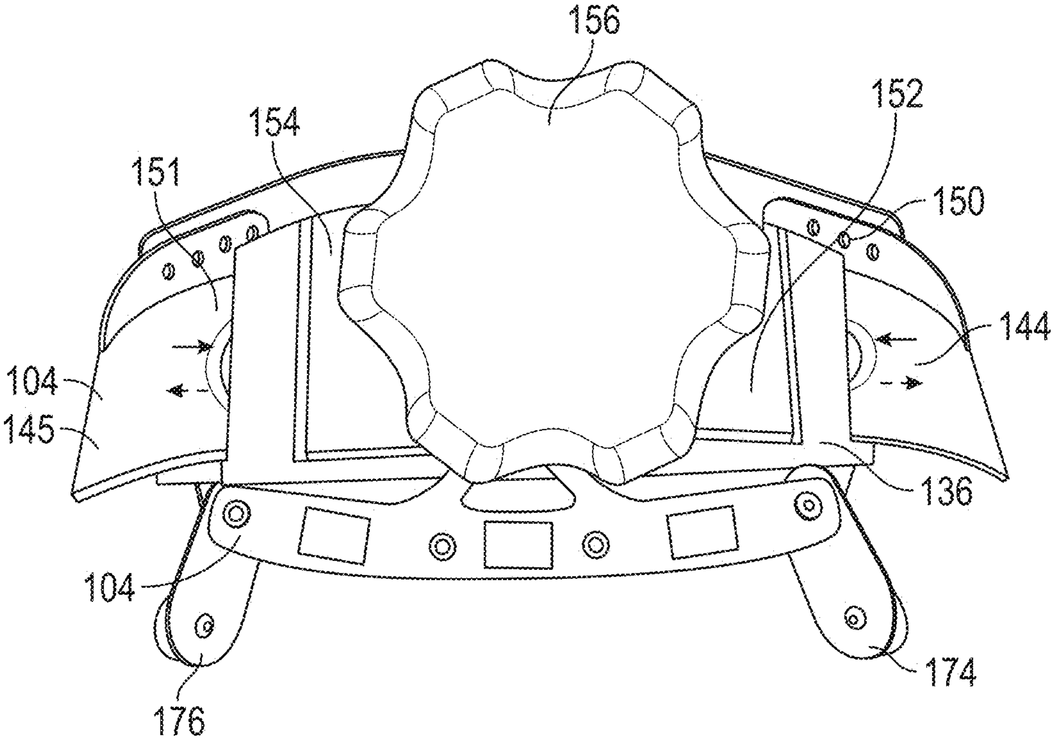
FIG. 19 is a back view of a headband frame of the personal protection assembly, according to an embodiment of the present disclosure.

As shown in FIG. 18, the right lateral portion 130 of the perimeter 120 is kept a vertical clearance distance D above the most superior portion 132 of skin between the helix 311 of the ear 4*b* and the head 313 of the user 2. Thus, the right lateral portion 130 of the perimeter 120 is able to slide over the cylindrical sliding surface 186 of the button 184, between the planar base 178 and the stop 188, without significantly contacting the most superior portion 132 of skin between the helix 311 of the ear 4*b* and the head 313 of the user 2 (FIG. 18). This free-sliding movement of the perimeter 120 over the cylindrical sliding surface 186 of the right hook assembly 174 and a left hook assembly 176, bypasses any interfering contact with the ears 4*b*, 4*a* of the user 2. Thus, any left and right rotation, or other shifting of the head 313 of the user 2, do not pull on the perimeter 120 and thus do not cause the location of the frame 104 on the head 313 of the user 2 to be moved or displaced. For example, the first slideable hook (right hook assembly 174), the second slideable hook (left hook assembly 176), the right lateral portion 130, and the left lateral portion 128 are configured such that a rotation of the user's head 313 producing a slide of +X mm between the right hook assembly 174 and the right lateral portion 130 generally causes a slide of −X mm between the left hook assembly 176 and the left lateral portion 128. For example, if a positive slide is substantially toward the anterior and a negative slide is substantially toward the posterior, or vice versa. In some embodiments, the planar base 178 comprises polycarbonate, polyester, polyamide, or polyimide. The planar base 178 can be configured with a thickness between 0.3 mm to 0.7 mm, or 0.4 mm to 0.6 mm, and may be configured to allow at least some flexure. The vertical clearance distance D can be between 0 mm and 12.7 mm, or between 0 mm and 10 mm, or between 1 mm and 10 mm. The pivot of the hook assemblies 174, 176 (about axis a, FIG. 20) can be utilized to adjust not only the free angle of pivot $A_P$ (FIG. 21), but also to effectively adjust the vertical clearance distance D above the most superior portion 132 of skin between the helix 311 of the ear 4*b* and the head 313 of the user 2 to best fit the particular user 2 (e.g., wearer).

FIG. 20 illustrates a sagittal plane $P_S$ of the frame 104 and a takeoff angle $A_T$ of the left hook assembly 174. The right hook assembly 176 can be configured as a mirror image of the left hook assembly 174. The takeoff angle $A_T$ is between 5° and 20°, or between 10° and 15°. Thus, the included angle between the left hook assembly 174 and the right hook assembly 176 is between 10° and 40° or between 20° and 30°. In other embodiments, for example in a user/wearer 2 having asymmetric ears 4*a*, 4*b*, the takeoff angle $A_T$ of each side can be configured to be different from each other. Although the hooking of the perimeter 120 between the ear 4 and the head 313, facilitated by the hook assemblies 174, 176, creates a space 320 that allows full access to the ears 4, in other embodiments, it is not necessary to utilize the hook assemblies 174, 176 to uncover the ears 4. For example, some clean room manufacturing or high sterility medical procedures may require that the ears 4 be covered. In alternative embodiments, the hook assemblies 174, 176 can be configured to engage a seam in the sheet 108 that is spaced inward from the perimeter 120, but extends as an elongate projection configured to interface with the cylindrical sliding surface 186 of the hook assembly 174, 176, while still allowing the perimeter 120 to cover the ear 4.

Figure 23:
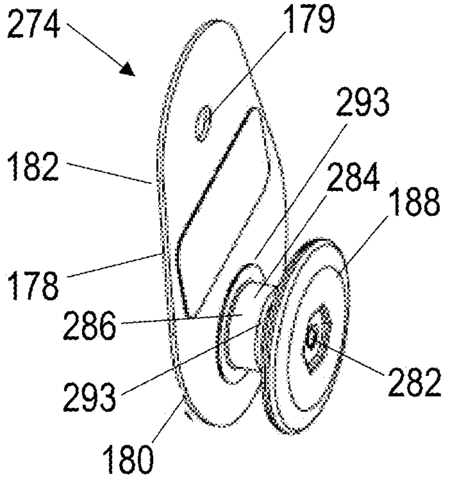
FIG. 23 is a perspective view of a hook assembly, according to an alternative embodiment of the present disclosure.

FIG. 23 illustrates an alternative hook assembly 274 compatible with the personal protection assembly 100 of FIGS. 3-22. The hook assembly 274 and the hook assemblies 174, 176 are generally referred to as dynamic hook assemblies. The hook assemblies 174, 176 are slideable or sliding hook assemblies, because they are configured to allow for sliding of portions of the perimeter 120 over the cylindrical sliding surfaces 186 (of each hook assembly). The hook assembly 274 (and its companion opposite side hook assembly, not shown) are rolling hook assemblies. The button 184, or the button 184/stop 188 combination, is/are replaced with a pulley 284. The pulley 284 is configured to be rotatably secured between the planar base 178 and the stop 188, to allow the right lateral portion 130 of the perimeter 120 of the sheet 108 to be rolled over the pulley surface 286 while the pulley 284 rotates. Thus, rolling friction is involved with the dynamic movement, instead of sliding friction. In some embodiments, there is both rolling friction and dynamic friction (some slip, but not all slip).

The pulley 284 includes a circular flange 293 on each side. Otherwise, the operation of the hook assembly 274 is similar that of the hook assemblies 174, 176, including any of the alternative embodiments (shapes, materials, etc.). Instead of a screw 183, the pulley 284 can be bonded to an axle 282 that can be rotated within the holes 181, 194 with low friction. Thus, movement of the head 313 of the user 2 from side-to-side, or up-and-down, or around, will not cause mechanical or frictional catching of the sheet 108, and stability will be maintained of the sheet 108 and helmet 401, such that the vision of the user 2 is not impeded (e.g., by movement of the helmet 401), and such that the helmet 401 stays in place. The pulley surface 286 in some embodiments comprises an arc having a radius of between 7 mm and 13 mm, or between 8 mm and 12 mm, or between 9 mm and 11 mm. In alternative embodiments, the hook assemblies 274, 276 can be configured to engage a seam in the sheet 108 that is spaced inward from the perimeter 120, but extends as an elongate projection configured to interface with the pulley surface 286 of the hook assembly 274, 276, while still allowing the perimeter 120 to cover the ear 4.

Figure 24:
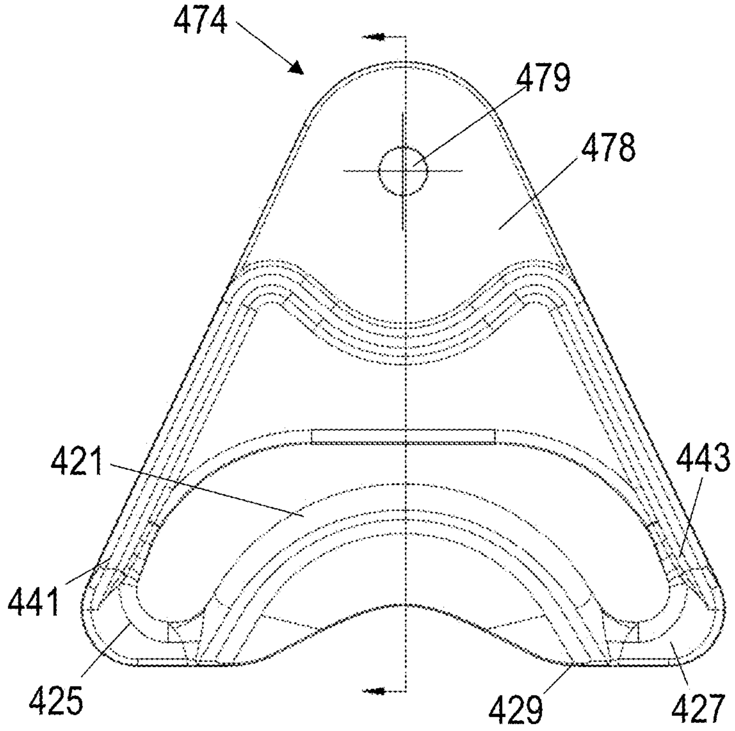
FIG. 24 is an elevation view of a hook according to an alternative embodiment of the present disclosure.
Figure 25:
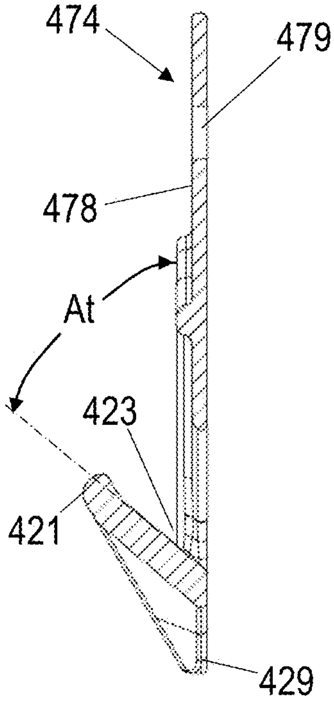
FIG. 25 is a side view of the hook of FIG. 24.
Figure 28:
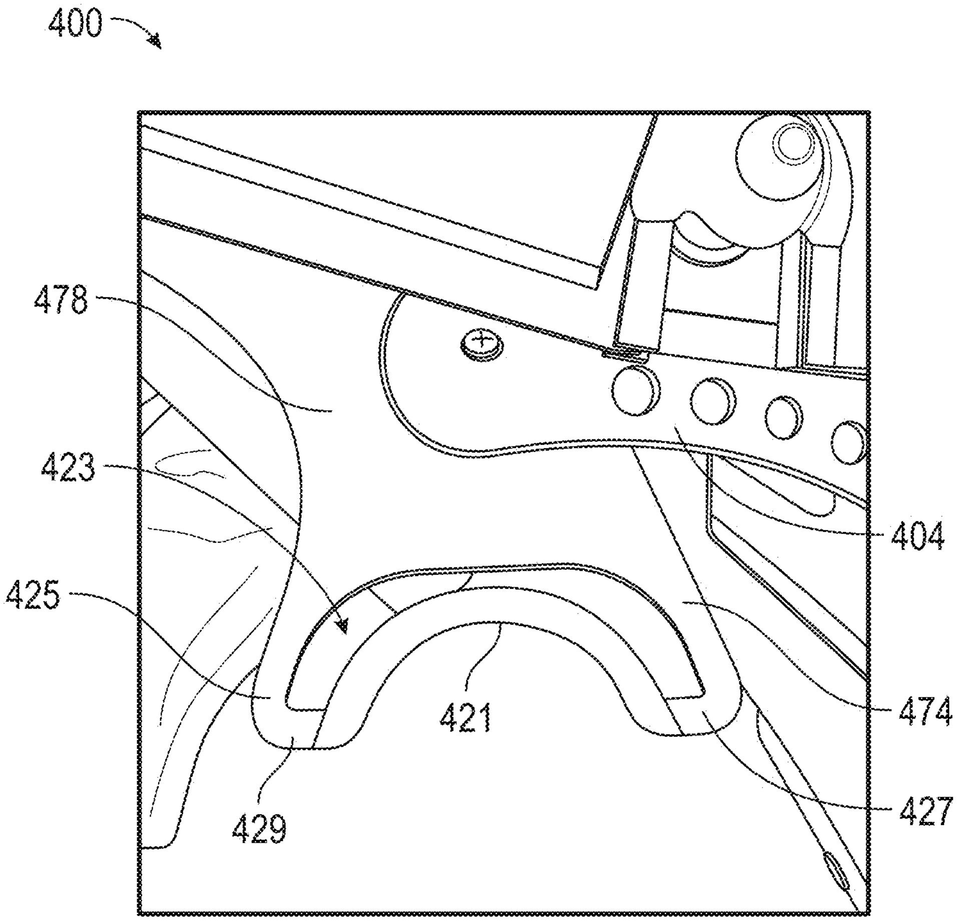
FIG. 28 is a side view of a hook of the personal protection assembly of FIG. 26.

FIGS. 24-28 illustrate an alternative personal protection assembly 400 comprising a helmet 401, a gaiter 402, and a frame 404. Instead of the hook assemblies 174, 176, there are two (or more) hooks 474 coupled to the frame 474 (e.g., one on each side). In the embodiment shown in FIGS. 24-28, the hooks 474 are statically coupled to the frame 474. Each hook 474 comprises a base portion 478 having a hole 479, a wing portion 421 extending from the base portion 478, and a trough 423 between the base portion 478 and the wing portion 421. The right lateral portion 130 of the perimeter 120 of the sheet 108 is configured to slide within the trough 423, between the base portion 478 and the wing portion 421. Trough angle $A_t$, between the plane of the base portion 478 and the general angle of extension of the wing portion 421, is between 5° and 50°, or between 20° and 40°, or between 25° and 35°. In some embodiments, the Trough angle $A_t$ comprises an acute angle. As shown in FIGS. 24 and 28, the wing 421 comprises a curvilinear portion extending between a first edge 425 and second edge 427 of the bottom 429 of the hook 474. Arm 441 and arm 443 connect the edges 425, 427 and the curvilinear portion of the wing 421 to the base portion 478. The curvilinear portion sweeps less than a 180° arc, but in alternative embodiments can sweep 180° or greater than 180°. In some embodiments, the hooks 474 comprise polyamide. In alternative embodiments, the gaiter 402 can be substituted by a bonnet (similar to the bonnet 102), or other types of head cover (hood, shroud, etc.). In alternative embodiments, the hooks 474 can be configured to engage a seam in the sheet 108 that is spaced inward from the perimeter 120, but extends as an elongate projection configured to interface with the trough 423 of the hook 474, while still allowing the perimeter 120 to cover the ear 4.

Figure 29:
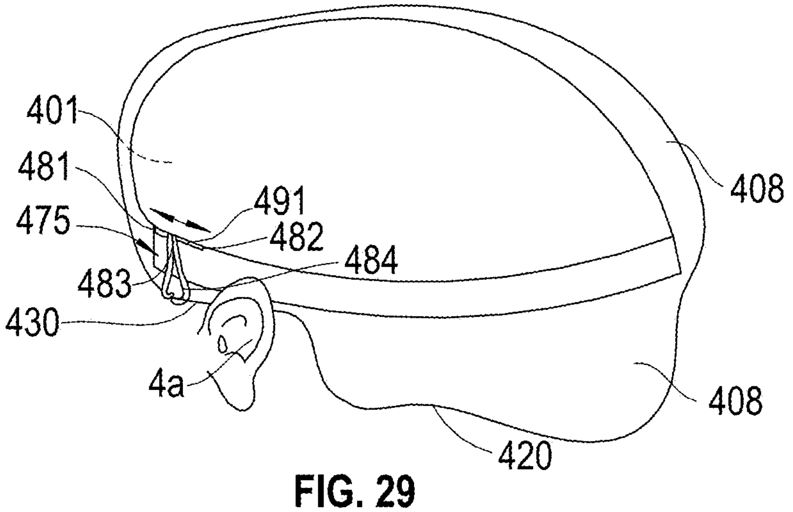
FIG. 29 is a perspective view of an alternative personal protection assembly, according to an embodiment of the present disclosure.
Figure 30:
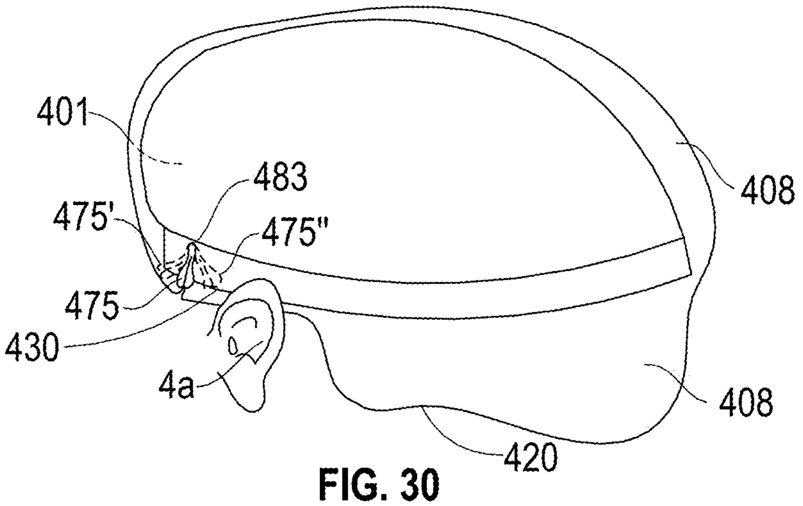
FIG. 30 is a perspective view of an alternative clip assembly, according to an embodiment of the present disclosure.
Figure 31:
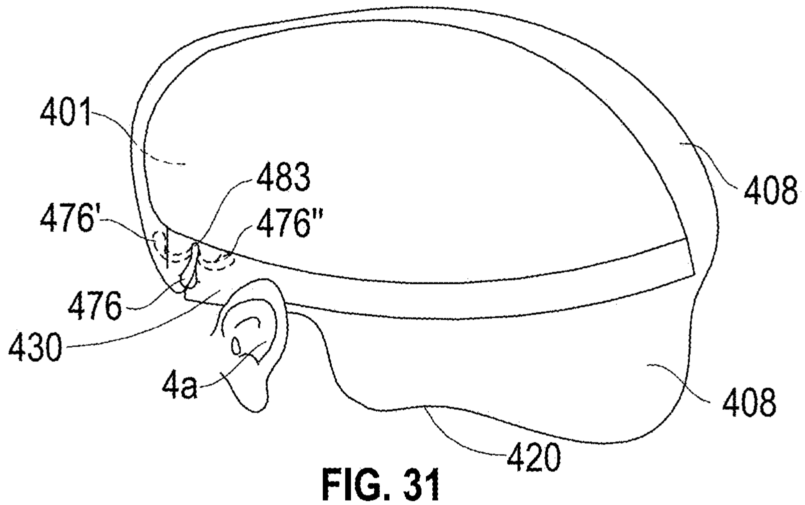
FIG. 31 is a perspective view of personal protection assembly having an alternative clip assembly, according to an embodiment of the present disclosure.

In an alternative embodiment of the personal protection assembly 400 of FIGS. 24-28, in place of the hook 474, FIG. 29 illustrates a clip 475 that is configured to statically clip/clamp the lateral portion 430 of the perimeter 420 of a sheet 408. And, an opposite clip (not shown) can be configured to clip/clamp the opposite lateral portion. The clip 475 comprises a clip base 483, and two opposing clip arms 484 configured to clip the material of the sheet 408 and hold it static in relation to the clip 475. The clip base 483 is configured to slide bidirectionally within a groove 491 in the helmet 401, between a first groove end 481 and a second groove end 482. Thus, the sliding movement of the clip 475 in relation to the ear 4*a*, is predictably controlled by the movement of the clip base 483 in the groove 491, instead of the perimeter 120 of the sheet 108 sliding in relation to the cylindrical sliding surface 186, or rolling on the pulley 284. The dynamic character of the clips 475, 476, 477, 488, 489 of FIGS. 29-34 is provided by their own movement or deformation. For example, the clips 475 can be configured to be actuated by an applied force to move the clipped fabric (along with at least the clipping portion of the clip, two-headed arrow, FIG. 29). In some embodiments, the free movement of the sheet 108 is actuated via deformation of at least a portion of the clip 475 (FIG. 30). The clip 475 is configured to deform or deflect up to an into first clip shape 475' in a first direction and second clip shape 475" in a second direction. The deformation can be configured to be within the elastic limit of the polymer that comprises the clip. The clip base 483 of the clip 475 of FIG. 30 is statically carried by the helmet 401. The clip base 483 can be snapped to the helmet, or bonded adhesive, epoxy, etc.) or heat bonded, or otherwise fused. In some embodiments, such as the embodiment illustrated in FIG. 31, the free movement of the sheet 108 is actuated via flexure of at least a portion of a clip 476 (e.g., the base) into a first clip shape 476' in a first direction and a second clip shape 476" in a second direction. The range of the clip shape of the clip 475 of FIG. 30 is substantially horizontal, with some vertical displacement caused by the movement toward the first flip shape 475' or toward the second clip shape 475". The range of the clip shape of the clip 476 of FIG. 31 is both horizontal and vertical caused by the movement toward the first flip shape 476' or toward the second clip shape 476".

Figure 32:
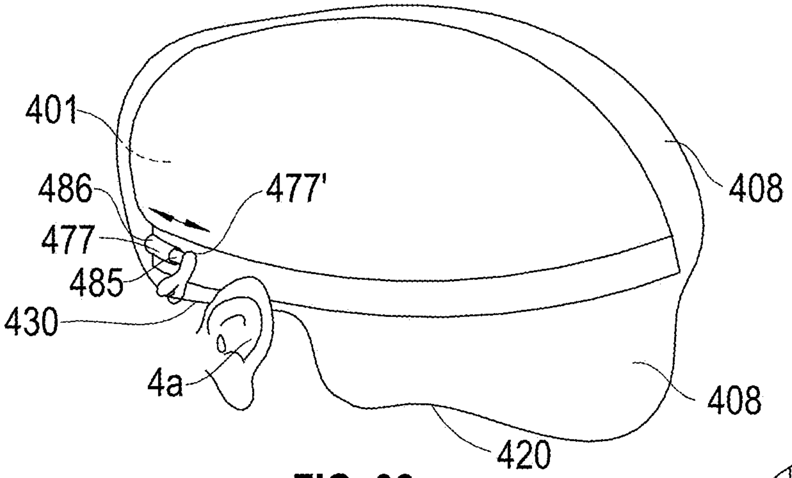
FIG. 32 is a perspective view of personal protection assembly having an alternative clip assembly, according to an embodiment of the present disclosure.
Figure 32A:
FIG. 32*a* is a detail view of the alternative clip assembly of FIG. 32 in a partially extended position.
Figure 32B:
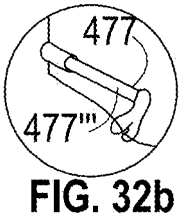
FIG. 32*b* is a detail view of the alternative clip assembly of FIG. 32 in a fully extended position.
Figure 33:
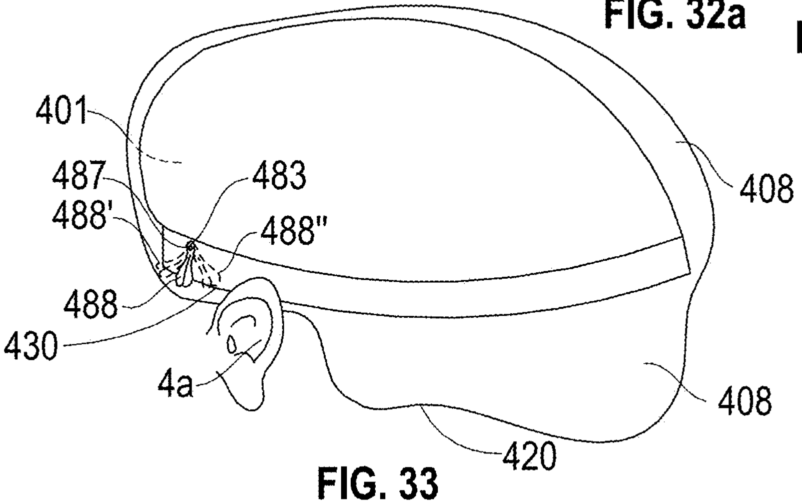
FIG. 33 is a perspective view of personal protection assembly having an alternative clip assembly, according to an embodiment of the present disclosure.

In some embodiments, such as the embodiment illustrated in FIG. 32, the free movement of the sheet 108 is actuated via some telescoping between at least two different telescoping elements of the clip 477 into a first retracted configuration 477' in a first, retracted direction, and a second extended configuration 477" in a second direction (FIG. 32*a*), and a third fully extended configuration 477'" (FIG. 32*b*). The inner elongate portion 485 telescopes within the outer, hollow elongate portion 486, allowing a continuous amount of retraction and extension between a most retracted configuration and a most extended configuration. In some embodiments, such as the embodiment illustrated in FIG. 33, the free movement of the sheet 108 is actuated via some articulation between at least two different articulating elements of the clip 488 into a first clip shape 488' in a first articulation comprising a first angle of rotation, and a second clip shape 488" in a second articulation comprising a second angle of rotation (FIG. 33). In FIG. 33, the first angle of rotation is a negative angle and the second angle of rotation is a positive angle, both in relation to a neutral angle. The articulation joint 487 comprises a pivot, but in other embodiments can comprise a deformable bend, or a bellow or corrugation. In alternative embodiments, the clips 475, 476, 477, 488, 489 can be configured to engage a seam in the sheet 108 that is spaced inward from the perimeter 120, but extends as an elongate projection configured to interface with the active portion of the clip 475, 476, 477, 488, 489, while still allowing the perimeter 120 to cover the ear 4.

Figure 34:
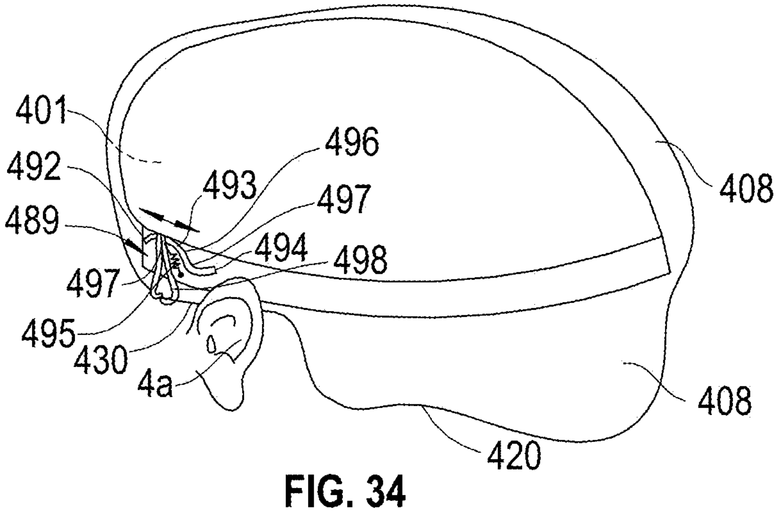
FIG. 34 is a perspective view of personal protection assembly having an alternative clip assembly, according to an embodiment of the present disclosure.

The groove 491 in the helmet 401 of FIG. 29 is a relatively straight pathway in terms of not substantially varying vertically. Though, it may curve along an outer contour along the helmet 401 that curves around the user's head. However, a curvilinear groove 493 that does vary significantly in a vertical sense can be utilized, as shown in FIG. 34. As illustrated in FIG. 34, a clip 489 can be figured to slide within the curvilinear groove 493 that curves both downward 496 and upward 497 in a vertical sense. In other embodiments, the curvilinear groove 493 curves only downward. In other embodiments, the curvilinear groove 493 curves only upward. In any of these embodiments, though not required, there can be a spring or other biasing element 495 applied between two portions (e.g., between a static portion and a dynamic portion, such as between the helmet 401 and the clip 489), such that at least some of the actuation has some return or recovery bias. In some embodiments, the return or recovery is substantially full (e.g., 95% to 100%).

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

For purposes of the present disclosure and appended claims, the conjunction "or" is to be construed inclusively (e.g., "an apple or an orange" would be interpreted as "an apple, or an orange, or both"; e.g., "an apple, an orange, or an avocado" would be interpreted as "an apple, or an orange, or an avocado, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open-ended terminology, with the same meaning as if the phrase "at least" were appended after each instance thereof.

What is claimed is:

1. A protective headcover system comprising:

a support configured to engage the head of a user;

a cover configured to substantially cover the head of the user while leaving the ears of the user substantially uncovered, the cover comprising a substantially transparent facial shield and a sheet coupled to the facial shield, the sheet comprising a perimeter; and a first hook statically coupled to the support and comprising a first surface configured to slidingly interface with a first lateral portion of the perimeter of the sheet.

2. The system of claim 1, further comprising:

a second hook coupled to the support and comprising a second surface configured to slidingly interface with a second lateral portion of the perimeter of the sheet, opposite the first lateral portion of the perimeter of the sheet.

3. The system of claim 2, wherein the first hook is coupled to a left side of the support and the second hook is coupled to a right side of the support.

4. The system of claim 2, wherein the second lateral portion comprises gathered material covering an elastic band, and wherein the first hook, the second hook, the first lateral portion, and the second lateral portion are configured such that a rotation of the head of the user producing a slide of +X mm between the first hook and the first lateral portion generally causes a slide of −X mm between the second hook and the second lateral portion.

5. The system of claim 1, wherein the support comprises a helmet and a headband coupled to the helmet.

6. The system of claim 1, wherein the sheet comprises a first sheet material configured to act as a substantial barrier to the passage of air.

7. The system of claim 6, wherein the sheet further comprises a second sheet material configured to filter contaminants from air.

8. The system of claim 1, wherein the sheet is sealingly coupled to the facial shield.

9. The system of claim 8, wherein the sheet is sealingly coupled to the facial shield continuously around a facial shield perimeter.

10. The system of claim 1, wherein the first lateral portion comprises gathered material covering an elastic band.

11. The system of claim 10, wherein the gathered material covering the elastic band has a transverse dimension of between 1 mm and 4 mm.

12. The system of claim 10, wherein the first surface of the first hook comprises a smooth surface configured for low-friction sliding with the gathered material of the first lateral portion.

13. The system of claim 12, wherein the smooth surface comprises stainless steel.

14. The system of claim 12, wherein the smooth surface has a surface roughness of 1.6 micrometers or less.

15. The system of claim 12, wherein the smooth surface of the first hook comprises a trough between a base portion and a wing portion of the first hook, the wing portion extending from the base portion at an acute angle.

16. The system of claim 12, wherein the smooth surface is configured to reside at an elevation between 0 mm and 12.7 mm higher than the most superior portion of skin between the helix and the head of the corresponding ear, when the support is engaged on the head of the user.

17. The system of claim 12, wherein the smooth surface comprises a convex arc having a radius of between 7 mm and 13 mm.

18. The system of claim 17, wherein the convex arc covers at least 45°.

19. The system of claim 17, wherein the first hook further comprises a planar base comprising a first portion adjacent to a first side of the convex arc, and a stop adjacent to a second side of the convex arc, the stop having a maximum dimension greater than the radius of the convex arc, such that the gathered material covering the elastic band is slidably held in place on the convex arc by the stop.

20. The system of claim 19, wherein the planar base is configured to be able to flex.

21. The system of claim 19, wherein the planar base comprises a material selected from the list consisting of: polycarbonate, polyester, polyamide, and polyimide.

22. The system of claim 19, wherein the planar base comprises a second portion configured to couple the planar base to the support.

23. The system of claim 22, wherein the second portion of the planar base is pivotably coupled to the support.

24. The system of claim 23, wherein the planar base is configured to pivot at least 15° in a first direction and 15° in a second direction.

25. The system of claim 23, wherein pivotability of the second portion of the planar base is lockable.

26. The system of claim 25, wherein the pivotability of the second portion of the planar base is unlockable.

27. The system claim 22, wherein the support has a sagittal plane, and wherein the planar base of the first hook is configured to extend substantially downwardly from the second portion to the first portion with an angle in relation to the sagittal plane that is between 5° and 20°.

28. The system of claim 12, wherein the smooth surface of the first hook comprises a trough between a base portion and a wing portion of the first hook, the wing portion extending from the base portion at an acute angle.

29. The system of claim 28, wherein the wing portion comprises a curvilinear extension having a first end extending from a first side of the base portion and a second end extending from a second side of the base portion.

30. The system of claim 29, wherein the curvilinear extension sweeps less than 180°.

* * * * *